United States Patent
Guo et al.

(10) Patent No.: US 11,685,681 B2
(45) Date of Patent: Jun. 27, 2023

(54) METHOD FOR TREATMENT OF MIXED ELECTROPLATING WASTERWATER WITHOUT CYANIDE AND PHOSPHORUS-CONTAINING REDUCTANT

(71) Applicant: GUANGZHOU ULTRA UNION CHEMICALS LTD, Guangdong (CN)

(72) Inventors: Chongwu Guo, Guangdong (CN); Fonvoon Lai, Guangdong (CN)

(73) Assignee: GUANGZHOU ULTRA UNION CHEMICALS LTD, Guangzhou (CN)

( * ) Notice: Subject to any disclaimer, the term of this patent is extended or adjusted under 35 U.S.C. 154(b) by 123 days.

(21) Appl. No.: 17/409,554

(22) Filed: Aug. 23, 2021

(65) Prior Publication Data

US 2021/0380455 A1    Dec. 9, 2021

Related U.S. Application Data

(62) Division of application No. 16/236,371, filed on Dec. 29, 2018, now Pat. No. 11,136,254.

(30) Foreign Application Priority Data

Aug. 10, 2018    (CN) .......................... 201810907181.4

(51) Int. Cl.
```
C02F 9/00      (2023.01)
C02F 1/52      (2023.01)
C02F 1/00      (2023.01)
C02F 1/28      (2023.01)
C02F 1/66      (2023.01)
C02F 1/70      (2023.01)
C02F 3/02      (2023.01)
C02F 1/56      (2023.01)
C02F 101/18    (2006.01)
C02F 101/38    (2006.01)
C02F 101/34    (2006.01)
C02F 101/22    (2006.01)
C02F 103/16    (2006.01)
C02F 1/72      (2023.01)
```
(52) U.S. Cl.
CPC ................ *C02F 9/00* (2013.01); *C02F 1/004* (2013.01); *C02F 1/283* (2013.01); *C02F 1/5245* (2013.01); *C02F 1/56* (2013.01); *C02F 1/66* (2013.01); *C02F 1/70* (2013.01); *C02F 1/72* (2013.01); *C02F 3/02* (2013.01); *C02F 2101/18* (2013.01); *C02F 2101/22* (2013.01); *C02F 2101/34* (2013.01); *C02F 2101/38* (2013.01); *C02F 2103/16* (2013.01); *C02F 2209/04* (2013.01); *C02F 2209/06* (2013.01); *C02F 2301/08* (2013.01)

(58) Field of Classification Search
CPC ........ C02F 1/004; C02F 1/283; C02F 1/5245; C02F 1/56; C02F 1/66; C02F 1/70; C02F 1/72; C02F 2101/18; C02F 2101/22; C02F 2101/34; C02F 2101/38; C02F 2103/16; C02F 2209/04; C02F 2209/06; C02F 2301/08; C02F 3/02; C02F 9/00
See application file for complete search history.

(56) References Cited

U.S. PATENT DOCUMENTS

| | | |
|---|---|---|
| 6,254,782 B1 | 7/2001 | Kreisler |
| 6,274,045 B1 | 8/2001 | Kreisler |

FOREIGN PATENT DOCUMENTS

| | | |
|---|---|---|
| CN | 104961273 B | 7/2017 |
| CN | 105347505 B | 12/2017 |
| CN | 107857389 A | 3/2018 |
| CN | 108383269 A | 8/2018 |
| WO | 2019085128 A1 | 5/2019 |

*Primary Examiner* — Dirk R Bass

(57) ABSTRACT

A method for treatment of mixed electroplating wastewater without a cyanide and a phosphorus-containing reductant without a cyanide and a phosphorus-containing reductant. A ferrous chloride solution is added into electroplating wastewater without a cyanide and a phosphorus-containing reductant. The pH of wastewater is adjusted to 10.5-12. Pollutants such as sodium cyanide and hydroxyl-containing organic amine complexants are oxidized with sodium hypochlorite. Carboxyl-containing organic acid complexants are precipitated. Hexavalent chromium is reduced to trivalent chromium to form chromium hydroxide precipitate. Precipitate is removed by filtering and wastewater is adjusted to pH 4.5-5.5. Heavy metal ions are precipitated with sodium dimethyldithiocarbamate or sodium diethyldithiocarbamate. Precipitate and heavy metal capturing agents are adsorbed with activated carbon followed by removal of precipitate. Wastewater is adjusted to pH 6-8. Aliphatic polyamine complexants are destroyed using an available biological degradation technique to reduce chemical oxygen demand.

7 Claims, No Drawings

METHOD FOR TREATMENT OF MIXED ELECTROPLATING WASTERWATER WITHOUT CYANIDE AND PHOSPHORUS-CONTAINING REDUCTANT

CROSS-REFERENCE TO RELATED APPLICATIONS

This application is a divisional application of U.S. patent application Ser. No. 16/236,371, filed on Dec. 29, 2018, which claims the benefit of priority from Chinese Application No. 201810907181.4, filed on Aug. 10, 2018. The content of the aforementioned application, including any intervening amendments thereto, is incorporated herein by reference in its entirety.

TECHNICAL FIELD

The present application relates to industrial wastewater treatment, and particularly to a method for treatment of mixed electroplating wastewater without a cyanide and a phosphorus-containing reductant.

BACKGROUND

Electroplating wastewater generally includes cyanide copper plating wastewater, pyrophosphate copper plating wastewater, acid copper plating wastewater, bright nickel-plating wastewater, potassium chloride zinc plating wastewater, alkaline non-cyanide zinc plating wastewater, cyanide imitation gold copper-zinc alloy electroplating wastewater, gun-color tin-nickel alloy electroplating wastewater, alkaline zinc-nickel alloy electroplating wastewater, acidic zinc-nickel alloy electroplating wastewater, hexavalent chromium plating wastewater, trivalent chromium plating wastewater, electroless nickel plating wastewater, electroless copper plating wastewater, hexavalent chromium passivation wastewater, trivalent chromium passivation wastewater, degreasing wastewater, pickling wastewater, and etc. The electroplating wastewater usually contains complexants such as sodium cyanide, potassium pyrophosphate, sodium citrate, sodium potassium tartrate, sodium malate, diethylene triamine and hydroxyl-containing organic amines; heavy metal ions such as copper ions, nickel ions, zinc ions, hexavalent chromium and trivalent chromium; and other pollutants such as sodium phosphate, sodium hypophosphite, brighteners, auxiliary brighteners and surfactants.

Sodium citrate is a complexant commonly used in electroplating, electroless nickel plating and trivalent chromium passivation processes. Sodium citrate has a relatively strong antioxidation so that its oxidation requires a large amount of oxidants using the conventional oxidation process, resulting in high costs. In addition, it is difficult to effectively remove the complexants such as sodium citrate in winter at lower temperature, and thus the content of heavy metal ions in the treated wastewater often cannot meet the requirements of *Emission Standard for Pollutants in Electroplating*.

Complexants of aliphatic polyamines such as diethylenetriamine and hydroxyl-containing organic amines possess very strong antioxidation so that these complexants in the wastewater cannot be effectively removed using the conventional oxidation process, resulting in great difficulty in the electroplating wastewater treatment. Some electroplating wastewater treatment plants employ strong oxidation to oxidize such complexants with the purpose of precipitating the hydroxides of heavy metal, but with undesirable effect.

Patent CN 104961273B, titled "Method for Treating Alkaline Zinc-Nickel Alloy Electroplating Wastewater", discloses a process in which sodium dimethyldithiocarbamate is used to precipitate heavy metal ions such as nickel and zinc ions at pH of 4.5-5.5, so that the remaining amount of the heavy metal ions can meet the requirements in Table 2 of GB 21900-2008, *Emission Standard for Pollutants in Electroplating*.

Patent Application Publication CN 107857389 A, titled "Method for Treating Alkaline Zinc-Nickel Alloy Electroplating Wastewater", further discloses a process in which sodium diethyldithiocarbamate is used to precipitate nickel and zinc ions at pH of 4.5-5.5, so that the treated wastewater can meet the emission requirements in Table 3 of GB 21900-2008.

Sodium dimethyldithiocarbamate or sodium diethyldithiocarbamate as used in the above two references is capable of effectively removing the nickel and zinc ions in electroplating wastewater containing an aliphatic polyamine complexant. However, the aliphatic polyamine complexant has very good coordination with copper ions, and there is no report about whether the two heavy metal capturing agents can effectively remove the copper ions in wastewater.

Currently, the electroplating industrial park treats the electroplating wastewater in a centralized manner. Various electroplating wastewaters are mixed and discharged into the electroplating sewage treatment plant for an integrated treatment. It is difficult to treat the mixed wastewater due to its complex components, so that the treated wastewater is hard to reach a treatment result that meets standards. Although the electroplating wastewater treatment has made great progress during more than 10 years of technical upgrading, it is still challenging to make the content of heavy metal ions meet standards and reduce the treatment costs in the electroplating industry.

SUMMARY

In view of the above problems, the present invention provides a method for integrated treatment of electroplating wastewater, enabling an effective treatment of heavy metals, complexants, COD (Chemical Oxygen Demand), etc. in the electroplating wastewater.

Particularly, a method for integrated treatment of the electroplating wastewater includes the following steps:

(1a) adjusting the electroplating wastewater with lime milk to pH of 10.5-12 under mechanical stirring, and adding an oxidant for an oxidation for 90-240 minutes by controlling an ORP value to precipitate pyrophosphate, phosphate, heavy metal ions and fluoride ions;

(2a) adding a ferrous chloride solution into the electroplating wastewater treated in step (1a) under mechanical stirring and adjusting the electroplating wastewater with lime milk to pH of 10.5-12; wherein a synergistic effect of ferrous ions and calcium ions allows a complete precipitation of carboxyl-containing organic acid complexants; metal ions released from complexes react with hydroxyl ions to form hydroxide precipitate; and ferrous ions can reduce hexavalent chromium to trivalent chromium to form a chromium hydroxide precipitate;

(3a) flocculating the precipitate in the electroplating wastewater treated in step (2a) with a flocculant into particles of large size to settle;

(4a) filtering the electroplating wastewater treated in step (3a) to remove the precipitate;

(5a) adjusting and maintaining pH of the electroplating wastewater treated in step (4a) at 4.5-5.5 with dilute hydrochloric acid, and introducing a heavy metal capturing agent to precipitate heavy metal ions;

(6a) adding activated carbon to the electroplating wastewater treated in step (5a) to absorb the resulting precipitate and the remaining heavy metal capturing agent so as to settle the precipitate;

(7a) filtering the electroplating wastewater treated in step (6a) to remove the precipitate; and (8a) adjusting the electroplating wastewater treated in step (7a) to pH of 6-8 with a sodium hydroxide solution, and further processing the resulting electroplating wastewater using a biochemical method.

Electroplating wastewater is generally acidic so that the present application employs the lime milk to perform a neutralization reaction.

After the lime milk is used to adjust the electroplating wastewater to alkaline, pyrophosphate reacts with metal ions such as calcium ions to form precipitate such as calcium pyrophosphate, and phosphate forms precipitate with metal ions such as copper, zinc, nickel and calcium ions, and the remaining free heavy metal ions forms precipitate with hydroxyls, thereby removing these pollutants. In addition, calcium ions form calcium fluoride precipitate with fluoride ions so that the level of fluoride ions can be effectively reduced.

Moreover, some carboxyl-containing organic acid complexants with a strong antioxidant activity such as sodium citrate are further present in the electroplating wastewater. These complexants such as sodium citrate can be co-precipitated completely with ferrous ions and calcium ions under alkaline condition, meanwhile, the metal ions released from the complexants form precipitate with other ions such as hydroxyls.

Ferrous ions are able to reduce hexavalent chromium to trivalent chromium and form a chromium hydroxide precipitate under alkaline conditions, so that the hexavalent chromium in the wastewater can be effectively removed.

Hydrogen phosphate often cannot be used to form a precipitate such as calcium phosphate in electroplating wastewater with pH below 10.5, so that the method of the present invention for treating electroplating wastewater employs pH of 10.5-12.

Hydrogen peroxide reacts with calcium ions to form a precipitate Lender alkaline conditions, so that hydrogen peroxide is not recommended to use as an oxidant in the present invention.

The electroplating wastewater treated with the above steps still contains aliphatic polyamine complexants such as diethylenetriamine and heavy metals such as copper. The experimental results demonstrate that a heavy metal capturing agent such as sodium dimethyldithiocarbamate can be used to remove heavy metal ions such as copper ions at pH of 4.5-5.5.

The precipitate formed by the heavy metal capturing agents and heavy metal ions such as copper is generally less in the treatment process, so that it takes a long time for the precipitate to settle by natural sedimentation. Therefore, an activated carbon is required to be used for absorption of the precipitate, thereby accelerating the sedimentation. In addition, it is not suitable to use ferric chloride or aluminum sulfate as a coagulant to accelerate the sedimentation, since the iron ions or aluminum ions can consume the heavy metal capturing agent by forming a corresponding precipitate so that the aliphatic polyamine in the electroplating wastewater can regain the metal ions such as copper from the formed precipitate to form a complex, resulting in an increase in the concentration of these heavy metals.

After removing the heavy metal pollutants, the electroplating wastewater is adjusted to pH of 6-8 and then a biodegradation method can be employed to destroy the aliphatic polyamine complexant and effectively reduce the COD.

Two stirring methods, including mechanical stirring and air stirring, are generally applied in the treatment of electroplating wastewater. However the present invention only employs the mechanical stirring, since ferrous ions may be oxidized by air to lose its reducibility under air stirring and the mechanical stirring can prevent the blowing pipe from being buried and blocked with sand and sediment during the treatment of wastewater.

In the case where the electroplating wastewater contains at least one of cyanide and a phosphorus-containing reductant (such as sodium hypophosphite), an oxidant can be used to destroy the cyanide and/or sodium hypophosphite. Under alkaline conditions and the catalytic action of copper ions, sodium hypochlorite can effectively destroy the complexants such as cyanide and thiocyanate in the electroplating wastewater, and the metal ions released from the complex can react with other ions such as phosphate and hydroxide to form a precipitate. The hydroxyl-containing organic amine complexant in electroless copper-plating can be oxidized to an organic acid complexant containing amine group and carboxyl group by sodium hypochlorite. Sodium hypochlorite can also effectively oxidize sodium hypophosphite used as a reductant in the electroless nickel-plating to form sodium phosphate, and similarly, sodium hypochlorite can effectively oxidize the reductant used in the electroless copper-plating to reduce the COD in the wastewater. For the wastewater without cyanide and sodium hypophosphite, an oxidant can be used to oxidize other compounds with a strong reducibility, thereby reducing the COD in the wastewater.

In some embodiments, a method for integrated treatment of electroplating wastewater without a cyanide and a phosphorus-containing reductant includes the following steps:

(1b) adding a ferrous chloride solution into the electroplating wastewater without a cyanide and a phosphorus-containing reductant under mechanical stirring;

(2b) adjusting the electroplating wastewater treated in step (1b) to pH of 10.5-12; wherein a synergistic effect of ferrous ions and calcium ions enables a complete precipitation of a carboxyl-containing organic acid complexant; metal ions released from complexant react with hydroxyl ions to form hydroxide precipitate; and ferrous ions reduce hexavalent chromium to trivalent chromium to form chromium hydroxide precipitate;

(3b) flocculating the precipitate in the electroplating wastewater treated in step (2b) with a flocculant into particles of large size to settle;

(4b) filtering the electroplating wastewater treated in step (3b) to remove the precipitate;

(5b) adjusting and maintaining pH of the electroplating wastewater treated in step (4b) at 4.5-5.5 with dilute hydrochloric acid, and introducing a heavy metal capturing agent to precipitate heavy metal ions;

(6b) adding activated carbon to the electroplating wastewater treated in step (5b) to absorb the resulting precipitate and the remaining heavy metal capturing agent so as to settle the precipitate;

(7b) filtering the electroplating wastewater treated in step (6b) to remove the precipitate; and (8b) adjusting the electroplating wastewater treated in step (7b) to pH of 6-8 with a sodium hydroxide solution, and further processing the resulting electroplating wastewater using a biochemical method.

For the electroplating wastewater without cyanide and phosphorus-containing reductant (such as sodium hypophosphite), the oxidant is not required, thereby making the wastewater treatment simpler and reducing the cost on the basis of ensuring the discharged electroplating wastewater meet the standards.

In some embodiments, the lime milk in step (1a) or (2b) contains calcium oxide at a concentration of 50-100 g/L.

In some embodiments, the ferrous chloride solution in step (2a) or (1b) contains ferrous chloride tetrahydrate at a concentration of 150-250 g/L.

In some embodiments, the ferrous chloride solution is added until a green precipitate of ferrous hydroxide appears, and then the ferrous chloride solution is further added to the electroplating wastewater at a volume ratio of 1-10:1000.

In some embodiments, the heavy metal capturing agent in step (5a) or (5b) is a sodium dimethyldithiocarbamate solution at a concentration of 80-120 g/L, and a volume ratio of the added sodium dimethyldithiocarbamate solution to the electroplating wastewater is 0.5-3:1000.

In some embodiments, the heavy metal capturing agent in step (5a) or (5b) is a sodium diethyldithiocarbamate trihydrate solution at a concentration of 80-120 g/L, and a volume ratio of the added sodium diethyldithiocarbamate trihydrate solution to the electroplating wastewater is 0.3-5:1000.

In some embodiments, the oxidant used in step (1a) is a sodium hypochlorite solution having active chlorine of a concentration of 1%-5% by weight.

In some embodiments, the ORP value is controlled to 150-400 mV using a potentiometer.

In some embodiments, the flocculant in step (3a) or (3b) is a polyacrylamide (PAM) aqueous solution at a concentration of 3-8 g/L.

In some embodiments, the dilute hydrochloric acid used in step (5a) or (5b) has a concentration of 2%-8% by weight, and the sodium hydroxide solution in step (8a) or (8b) has a concentration of 50-100 g/L.

In some embodiments, the activated carbon in step (6a) or (6b) is a powdered activated carbon for sewage treatment, and the activated carbon is added into the electroplating wastewater at an amount of 50-300 g per ton wastewater.

In some embodiments, the biochemical method in step (8a) or (8b) employs a microbial degradation technique to perform a reaction in a biochemical reactor for 8-24 hours according to chemical oxygen demand (COD).

The present invention has the following beneficial effects as compared to the prior art.

1. The method of the invention for integrated treatment of the electroplating wastewater can precipitate the carboxyl-containing organic acid complexants in the wastewater with the synergistic effect of ferrous ions and calcium ions, so that these complexants and heavy metal ions can be removed effectively and the difficulties in treating the complexants such as citric acid in the prior art can be solved. Moreover, the COD in the wastewater can also be reduced significantly.

2. The method of the invention for integrated treatment of the electroplating wastewater can reduce the hexavalent chromium to trivalent chromium using ferrous ions at a pH of 10.5-12, forming a precipitate, so that the hexavalent chromium in the wastewater can be removed effectively with lower costs.

3. The method of the invention for integrated treatment of the electroplating wastewater can destroy the aliphatic polyamine complexants using a biochemical method after the heavy metal capturing agents captured the heavy metal ions from the complex, thereby solving the technical difficulties in failing to remove these complexants with an oxidation method.

4. The method of the invention for integrated treatment of the electroplating wastewater can effectively and economically treat the complexants, heavy metal ions, phosphorus-containing compounds and the COD in the wastewater, thereby having a good market prospective.

DETAILED DESCRIPTION OF ILLUSTRATED EMBODIMENTS

The present invention will be described with reference to the embodiments for a better understanding. However, the invention may be implemented in various modes and is not limited to the embodiments described herein.

Unless otherwise defined, terminology used herein has the same meaning as commonly understood by those skilled in the art. The terms in the description are used only for illustration of the embodiments and are not intended to limit the invention. The term "and/or" used herein includes any and all combinations of one or more of the related elements.

The equipments used in the following embodiments of the present invention are conventional equipments.

Equipments: electroplating wastewater regulating tank, primary oxidation tank, secondary oxidation tank, tertiary oxidation tank, complexant precipitation tank, flocculation tank, inclined-tube settling tank A, chelation tank, inclined-tube settling tank B, neutralization tank, biodegradation tank, and plate and frame filter press.

Materials

Oxidant, a sodium hypochlorite solution with 3% by weight of active chlorine; ferrous chloride solution, a ferrous chloride tetrahydrate solution of a concentration of 200 g/L;

lime milk having calcium oxide of a concentration of 80 g/L; flocculant, a polyacrylamide (PAM) aqueous solution of a concentration of 5 g/L;

heavy metal capturing agent, a sodium dimethyldithiocarbamate solution of a concentration of 100 g/L;

powdered activated carbon for sewage treatment;

dilute hydrochloric acid with a concentration of 5% by weight; and sodium hydroxide solution of 50 g/L.

EXAMPLE 1

Treatment of Cyanide-Containing Electroplating Wastewater

The electroplating wastewater included: cyanide copper plating wastewater, cyanide copper-zinc alloy electroplating wastewater, gun-color tin-nickel alloy electroplating wastewater, pyrophosphate copper plating wastewater, alkaline zinc-nickel alloy electroplating wastewater, trivalent chromium plating wastewater, trivalent chromium passivation wastewater, hexavalent chromium passivation wastewater, acid copper plating wastewater, bright nickel plating wastewater, potassium chloride zinc plating wastewater, alkaline non-cyanide zinc plating wastewater and hexavalent chromium plating wastewater, and pretreatment wastewater for degreasing and pickling, but did not include electroless nickel plating wastewater and electroless copper plating wastewater.

Step (1) Cyanide Breaking

The electroplating wastewater was delivered from an electroplating wastewater regulating tank to a primary oxidation tank and was then stirred using a mixer. The electroplating wastewater was adjusted to pH of 10.5-12 with lime milk, and then an oxidant was added to break the cyanides for 60 minutes.

The pyrophosphate in the wastewater reacted with metal ions such as calcium ions to form a precipitate, and the phosphate reacted with metal ions such as copper, zinc, nickel and calcium ions to form precipitate.

A large amount of precipitate was produced in the primary oxidation tank, and especially calcium sulfate was easy to scale, so that it was not suitable to use a potentiometer in the primary oxidation tank to control the ORP value, avoiding the scaling of electrode.

Subsequently, the wastewater flowed from the primary oxidation tank into a secondary oxidation tank and was continuously stirred by a mixer. The lime milk was used to maintain the pH of the wastewater at 10.5-12, and controlling the ORP value at 300 mV with a potentiometer, the oxidant was continuously added to oxidize for 60 minutes, thereby oxidizing the cyanides to carbon dioxide. The ratio of the amount of the oxidant added to the primary oxidation tank to the amount of the oxidant added to the secondary oxidation tank was adjusted to 1:1.

After the wastewater flowed from the secondary oxidation tank into a tertiary oxidation tank, the reactions such as cyanide breaking and degradation of the oxidant were continued for 60 minutes.

Step (2) Precipitation of Carboxyl-Containing Organic Acid Complexants

Carboxyl-containing organic acids such as citric acid generally have higher oxidation resistance than cyanides, so that the wastewater after oxidation still contained complexants such as citric acid. The wastewater flowed from the tertiary oxidation tank into a complexant precipitation tank and was then stirred by a mixer. Lime milk was used to adjust the wastewater to pH of 10.5-12 followed by addition of a ferrous chloride solution into the wastewater until a green precipitate of ferrous hydroxide appeared. Hexavalent chromium was reduced to trivalent chromium to form a chromium hydroxide precipitate. Then, the ferrous chloride solution was further added into the wastewater at an amount of 3 L per ton wastewater to precipitate the carboxyl-containing organic acid complexants, and the heavy metal ions released from the complex reacted with hydroxyl ions to form a hydroxide precipitate.

Step (3) Separation of Precipitate

After the wastewater flowed from the complexant precipitation tank into a flocculation tank, a flocculant was added to flocculate the precipitate until the precipitate was agglomerated into particles of large size. The wastewater then flowed from the flocculation tank into an inclined-tube sedimentation tank A, and the precipitate settled to the bottom of the inclined-tube sedimentation tank A. The precipitate was pumped into a plate and frame filter press using a sludge pump for a pressure filtration, and the resulting filtrate flowed back to the electroplating wastewater regulating tank and the filter residue was treated by a qualified and professional factory.

Step (4) Chelation Precipitate

The supernatant in the inclined-tube sedimentation tank A flowed into a chelation tank and was stirred by a mixer. The pH of the wastewater was adjusted and maintained at 4.5-5.5 with dilute hydrochloric acid and then a heavy metal capturing agent was added into the wastewater at an amount of 2 L per ton wastewater to precipitate the remaining heavy metal ions such as copper ions. Afterwards, activated carbon was added into the wastewater at an amount of 150 g per ton wastewater to adsorb the precipitate and the remaining heavy metal capturing agent.

Step (5) Separation of Precipitate

After the wastewater flowed from the chelation tank into an inclined-tube sedimentation tank B, the precipitate settled to the bottom of the inclined-tube sedimentation tank B. The precipitate was pumped into the plate and frame filter press using a sludge pump for a pressure filtration, and the resulting filtrate flowed back to the electroplating wastewater regulating tank and the filter residue was treated by a qualified and professional factory.

Step (6) Biochemical Treatment

The supernatant in the inclined-tube sedimentation tank B flowed into a biodegradation tank followed by addition of sodium hydroxide solution to adjust the pH to 6-8 to perform a biodegradation treatment. When the COD reached the standards, the wastewater was allowed to be discharged.

EXAMPLE 2

Treatment of Electroplating Wastewater Containing Electroless Plating Wastewater The electroplating wastewater included: cyanide copper plating wastewater, cyanide copper-zinc alloy electroplating wastewater, gun-color tin-nickel alloy electroplating wastewater, pyrophosphate copper plating wastewater, alkaline zinc-nickel alloy electroplating wastewater, trivalent chromium plating wastewater, trivalent chromium passivation wastewater, hexavalent chromium passivation wastewater, acid copper plating wastewater, bright nickel-plating wastewater, potassium chloride zinc plating wastewater, alkaline cyanide-free zinc-plating wastewater and hexavalent chromium plating wastewater, electroless copper plating wastewater, electroless nickel plating wastewater and pretreatment wastewater for degreasing and pickling.

Step (1) Oxidation of Cyanides, Electroless Plating Complexants and Reductants

The electroplating wastewater was delivered from an electroplating wastewater regulating tank to a primary oxidation tank and was then stirred using a mixer. The electroplating wastewater was adjusted to pH of 10.5-12 with lime milk, and then an oxidant was added to oxidize the cyanides, electroless plating complexants and reductants for 60 minutes.

Meanwhile, the pyrophosphate and the phosphate in the electroplating wastewater reacted with free heavy metal ions to form a precipitate.

Subsequently, the electroplating wastewater flowed from the primary oxidation tank into a secondary oxidation tank and was continuously stirred by a mixer. The lime milk was used to maintain the pH of the wastewater at 10.5-12, and controlling the ORP value at 350 mV with a potentiometer, the oxidant was continuously added to oxidize for 60 minutes, thereby oxidizing the cyanides, the hydroxyl-containing organic amine complexants and sodium hypophosphite to carbon dioxide, carboxyl-containing organic acid salt and sodium phosphate, respectively. The ratio of the amount of the oxidant added to the primary oxidation tank to the amount of the oxidant added to the secondary oxidation tank was adjusted to 1:1.

After the wastewater flowed from the secondary oxidation tank into a tertiary oxidation tank, the reactions such as cyanide breaking and degradation of the oxidant were continued for 60 min.

Step (2) Precipitation of Carboxyl-Containing Organic Acid Complexants

The wastewater flowed from the tertiary oxidation tank into a complexant precipitation tank and was then stirred using a mixer. Lime milk was used to adjust the pH of the wastewater to 10.5-12 followed by addition of a ferrous chloride solution into the wastewater until a green precipitate of ferrous hydroxide appeared. Then, the ferrous chloride solution was further added into the wastewater at an amount of 4 L per ton wastewater to precipitate those carboxyl-containing organic acid complexants, and the heavy metal ions released from the complex reacted with hydroxyl ions to form a hydroxide precipitate. Moreover, hexavalent chromium was reduced to trivalent chromium to form a chromium hydroxide precipitate.

Step (3) Separation of Precipitate

After the wastewater flowed from the complexant precipitation tank into a flocculation tank, a flocculant was added to flocculate the precipitate until the precipitate was agglomerated into particles of large size. The wastewater then flowed from the flocculation tank into an inclined-tube sedimentation tank A, and the precipitate settled to the bottom of the inclined-tube sedimentation tank A. The precipitate was pumped into a plate and frame filter press using a sludge pump for a pressure filtration, and the resulting filtrate flowed back to the electroplating wastewater regulating tank and the filter residue was treated by a qualified and professional factory.

Step (4) Chelation Precipitate

The supernatant in the inclined-tube sedimentation tank A flowed into a chelation tank and was stirred using a mixer. The pH of the wastewater was adjusted and maintained at 4.5-5.5 using dilute hydrochloric acid and then a heavy metal capturing agent was added into the wastewater at an amount of 2 L per ton wastewater to precipitate the remaining heavy metal ions such as copper ions. Afterwards, activated carbon was added into the wastewater at an amount of 150 g per ton wastewater to adsorb the precipitate and the remaining heavy metal capturing agent.

Step (5) Separation of Precipitate

After the wastewater flowed from the chelation tank into an inclined-tube sedimentation tank B, the precipitate settled to the bottom of the inclined-tube sedimentation tank B. The precipitate was pumped into the plate and frame filter press using a sludge pump for a pressure filtration, and the resulting filtrate flowed back to the electroplating wastewater regulating tank and the filter residue was treated by a qualified and professional factory.

Step (6) Biochemical Treatment

The supernatant in the inclined-tube sedimentation tank B flowed into a biodegradation tank followed by addition of sodium hydroxide solution to adjust the pH to 6-8 to perform a biodegradation treatment. When the COD reached the standards, the wastewater was allowed to be discharged.

EXAMPLE 3

Treatment of Electroplating Wastewater Without Cyanide and Electroless Plating Wastewater The electroplating wastewater included: pyrophosphate copper plating wastewater, alkaline zinc-nickel alloy electroplating wastewater, trivalent chromium plating wastewater, trivalent chromium passivation wastewater, hexavalent chromium passivation wastewater, acid copper plating wastewater, bright nickel-plating wastewater, potassium chloride zinc plating wastewater, alkaline non-cyanide zinc-plating wastewater and hexavalent chromium plating wastewater, and pretreatment wastewater for degreasing and pickling.

Step (1) Oxidation of Organic Substances Such as Electroplating Additives

The electroplating wastewater was delivered from an electroplating wastewater regulating tank to a primary oxidation tank and was then stirred using a mixer. The electroplating wastewater was adjusted to pH of 10.5-12 with lime milk, and then an oxidant was added to oxidize for 60 minutes.

The pyrophosphate and the phosphate in the wastewater reacted with the free heavy metal ions to form a precipitate.

Subsequently, the wastewater flowed from the primary oxidation tank into a secondary oxidation tank and was continuously stirred by a mixer. The lime milk was used to maintain the pH of the wastewater at 10.5-12, and controlling the ORP value at 150-200 mV with a potentiometer, the oxidant was continuously added to oxidize for 60 minutes. The ratio of the amount of the oxidant added to the primary oxidation tank to the amount of the oxidant added to the secondary oxidation tank was adjusted to 1:1.

Strong oxidation was not required for the absence of the cyanide in the wastewater, so that the ORP value may be controlled at a lower level, thereby reducing the amount of oxidant to achieve to a lower cost. Some organic compounds with a strong reducibility can be destroyed through the oxidation, thereby alleviating the burden of the subsequent biochemical degradation.

After the wastewater flowed from the secondary oxidation tank into a tertiary oxidation tank, the reactions such as cyanide breaking and degradation of the oxidant were continued for 60 minutes.

Step (2) Precipitation of Carboxyl-Containing Organic Acid Complexants

The wastewater flowed from the tertiary oxidation tank into a complexant precipitation tank and was then stirred using a mixer. Lime milk was used to adjust the wastewater to pH of 10.5-12 followed by addition of a ferrous chloride solution into the wastewater until a green precipitate of ferrous hydroxide appeared. Then, the ferrous chloride solution was further added into the wastewater at an amount of 4 L per ton wastewater to precipitate the carboxyl-containing organic acid complexants, and the heavy metal ions released from the complex reacted with hydroxyl ions to form a precipitate. Moreover, hexavalent chromium was reduced to trivalent chromium to form a chromium hydroxide precipitate.

Step (3) Separation of Precipitate

After the wastewater flowed from the complexant precipitation tank into a flocculation tank, a flocculant was added to flocculate the precipitate until the precipitate was agglomerated into particles of large size. The wastewater then flowed from the flocculation tank into an inclined-tube sedimentation tank A, and the precipitate settled to the bottom of the inclined-tube sedimentation tank A. The precipitate was pumped into a plate and frame filter press using a sludge pump for a pressure filtration, and the resulting filtrate flowed back to the electroplating wastewater regulating tank and the filter residue was treated by a qualified and professional factory.

Step (4) Chelation Precipitate

The supernatant in the inclined-tube sedimentation tank A flowed into a chelation tank and was stirred using a mixer. The pH of the wastewater was adjusted and maintained at 4.5-5.5 with dilute hydrochloric acid and then a heavy metal capturing agent was added into the wastewater at an amount of 2 L per ton wastewater to precipitate the remaining heavy metal ions such as copper ions. Afterwards, activated carbon was added into the wastewater at an amount of 150 g per ton wastewater to adsorb the precipitate and the remaining heavy metal capturing agent.

Step (5) Separation of Precipitate

After the wastewater flowed from the chelation tank into an inclined-tube sedimentation tank B, the precipitate settled to the bottom of the inclined-tube sedimentation tank B. Then the precipitate was pumped into the plate and frame filter press using a sludge pump for a pressure filtration, and the resulting filtrate flowed back to the electroplating wastewater regulating tank and the filter residue was treated by a qualified and professional factory.

Step (6) Biochemical Treatment

The supernatant in the inclined-tube sedimentation tank B flowed into a biodegradation tank followed by addition of sodium hydroxide solution to adjust pH to 6-8 to perform a biodegradation treatment. When the COD reached the standards, the wastewater was allowed to be discharged.

EXAMPLE 4

Another Method for Treatment of Electroplating Wastewater without Cyanide and Electroless Plating Wastewater The electroplating wastewater included: pyrophosphate copper plating wastewater, alkaline zinc-nickel alloy electroplating wastewater, trivalent chromium chromium-plating wastewater, trivalent chromium passivation wastewater, hexavalent chromium passivation wastewater, acid copper plating wastewater, bright nickel-plating wastewater, potassium chloride zinc-plating wastewater, alkaline cyanide-free zinc-plating wastewater and hexavalent chromium plating wastewater, and pretreatment wastewater for degreasing and pickling.

Carboxyl-containing organic acid complexants in the electroplating mixed water without cyanide and electroless plating wastewater can be directly precipitated with no requirement of the oxidation, thereby reducing the cost for treating the wastewater. And organic substances such as electroplating additives in the wastewater were remained to be treated in the subsequent step of biochemical degradation.

Step (1) Precipitation of Carboxyl-Containing Organic Acid Complexants

The wastewater flowed from an electroplating wastewater regulating tank into a complexant precipitation tank and was then stirred using a mixer. A ferrous chloride solution was added into the wastewater at an amount of 5 L per ton wastewater followed by adjusting the wastewater to pH of 10.5-12 with lime milk. Ferrous ions and calcium ions co-precipitated the carboxyl-containing organic acid complexants and the pyrophosphate and the phosphate reacted with the free heavy metal ions to form precipitate. Moreover, hexavalent chromium was reduced to trivalent chromium to form chromium hydroxide precipitate.

Step (2) Separation of Precipitate

After the wastewater flowed from the complexant precipitation tank into a flocculation tank, a flocculant was added to flocculate the precipitate until the precipitate was agglomerated into particles of large size. The wastewater then flowed from the flocculation tank into an inclined-tube sedimentation tank A, and the precipitate settled to the bottom of the inclined-tube sedimentation tank A. The precipitate was pumped into a plate and frame filter press using a sludge pump for a pressure filtration, and the resulting filtrate flowed back to the electroplating wastewater regulating tank and the filter residue was treated by a qualified and professional factory.

Step (3) Chelation of the Precipitate

The supernatant in the inclined-tube sedimentation tank A flowed into a chelation tank and was stirred using a mixer. The pH of the wastewater was adjusted and maintained at 4.5-5.5 with dilute hydrochloric acid and then a heavy metal capturing agent was added into the wastewater at an amount of 2 L per ton wastewater to precipitate the remaining heavy metal ions such as copper ions. Afterwards, activated carbon was added into the wastewater at an amount of 200 g per ton wastewater to adsorb the precipitate and the remaining heavy metal capturing agent.

Step (4) Separation of Precipitate

After the wastewater flowed from the chelation tank into an inclined-tube sedimentation tank B, the precipitate settled to the bottom of the inclined-tube sedimentation tank B. The precipitate was pumped into the plate and frame filter press using a sludge pump for a pressure filtration, and the resulting filtrate flowed back to the electroplating wastewater regulating tank and the filter residue was treated by a qualified and professional factory.

Step (5) Biochemical Treatment

The supernatant in the inclined-tube sedimentation tank B flowed into a biodegradation tank followed by addition of sodium hydroxide solution to adjust pH to 6-8 to perform a biodegradation treatment. When the COD reached the standards, the wastewater was allowed to be discharged.

Experimental Example 1 Synergistic Effect of Ferrous Ions and Calcium Ions

A solution containing 200 mg/L of nickel sulfate hexahydrate and 400 mg/L of nitrilotriacetic acid was prepared and then adjusted to pH of 7 with 50 g/L of sodium hydroxide solution to produce a mixed solution.

Three portions of the mixed solution were added to three vessels separately labeled as Nos. 1, 2 and 3 at 1 L each. 3 g of anhydrous calcium chloride was added to No. 1 vessel and dissolved under stirring to obtain a mixture. The mixture was adjusted to pH of 11 with lime milk under stirring to produce a suspension. And 30 min later, the suspension was filtered with a quantitative filter paper to obtain a filtrate 1.

15 mL of 200 g/L ferrous chloride tetrahydrate solution was added to No. 2 vessel to obtain a mixture. The mixture was adjusted to pH of 11 with lime milk under stirring to produce a suspension. And 30 min later, the suspension was filtered with a quantitative filter paper to obtain a filtrate 2.

30 mL of 200 g/L ferrous chloride tetrahydrate solution was added to No. 3 vessel to obtain a mixture. The mixture was adjusted to pH of 11 with 50 g/L of sodium hydroxide solution under stirring to produce a suspension. And 30 min later, the suspension was filtered with a quantitative filter paper to obtain a filtrate 3.

The nickel content in the three filtrates was measured using atomic absorption spectrometry, and the results were presented in Table 1. As the results demonstrated, the single use of calcium ions to precipitate the nitrilotriacetic acid complexant under alkaline conditions can not remove the nickel ions effectively and the single use of ferrous ions to precipitate the nitrilotriacetic acid complexant under alkaline conditions also can not remove the nickel ions effectively, but the simultaneous use of calcium ions and ferrous ions to precipitate the nitrilotriacetic acid complexant under alkaline conditions can remove the nickel ions effectively.

TABLE 1

Results of precipitating nitrilotriacetic acid complexant with ferrous ions and calcium ions

| Samples | Amount of ferrous chloride tetrahydrate (g/L) | Amount of calcium chloride (g/L) | Reagent to adjust pH | Nickel ion content after treatment (mg/L) | GB 21900-2008 Standard |
| --- | --- | --- | --- | --- | --- |
| 1 | 0 | 3 | calcium hydroxide | 1.64 | substandard |
| 2 | 3 | 0 | calcium hydroxide | 0.41 | up to standard of Table 2 |
| 3 | 6 | 0 | sodium hydroxide | 1.72 | substandard |

Experimental Example 2 Effect of pH on Precipitating Zinc Ions

A solution containing 100 mg/L of zinc sulfate and 200 mg/L of malic acid was prepared.

Five portions of the solution were added in five vessels at 1 L each. Each of the five solutions was added with 15 mL of 200 g/L ferrous chloride tetrahydrate solution to obtain a mixed solution. The five mixed solutions was adjusted to pH of 10.0, 10.5, 11.0, 11.5 and 12.0, respectively, with lime milk to produce five suspensions. After a standing for 30 min, the five suspensions were filtered independently with quantitative filter papers to obtain five filtrates. The zinc content in each of the filtrates was measured using atomic absorption spectrometry, and the results were presented in Table 2.

TABLE 2

Results of effect of pH on treating zinc ions

| pH | Zinc content after treatment (mg/L) | GB 21900-2008 Standard |
| --- | --- | --- |
| 10.0 | 0.07 | up to standard of Table 3 |
| 10.5 | 0.18 | up to standard of Table 3 |
| 11.0 | 0.41 | up to standard of Table 3 |
| 11.5 | 1.13 | up to standard of Table 2 |
| 12.0 | 2.18 | sub standard |

As the results demonstrated, the zinc content with the treatment did not meet the requirements of GB 21900-2008 at a pH of 12, nevertheless, pH of 10.5-12 was selected in the present invention. Though a trace amount of zinc remained in the wastewater at a pH greater than 11.5, the zinc can be removed with a heavy metal capturing agent in the subsequent treatment.

Experimental Example 3 Reduction of Hexavalent Chromium With Ferrous Chloride Under Alkaline Conditions 1 L of 200 mg/L chromium trioxide solution containing 104 mg/L of chromium was prepared.

1 L of the chromium trioxide solution was added with 20 mL of 200 g/L ferrous chloride tetrahydrate solution to obtain a mixed solution. The mixed solution was adjusted to pH of 11 with lime milk under stirring to produce a suspension. The hexavalent chromium was reduced to trivalent chromium with ferrous ions and then formed chromium hydroxide precipitate and the remaining ferrous chloride was precipitated in the form of ferrous hydroxide. After a reaction for 30 min, the suspension was filtered with a quantitative filter paper to obtain a filtrate.

The hexavalent chromium content in the filtrate was determined to be 0.032 mg/L using diphenylformylhydrazine spectrophotometry, and the removal rate was 99.97%. The results demonstrated that the hexavalent chromium can be effectively removed using the method of the present invention for integrated treatment of the electroplating wastewater.

Experimental Example 4 Treatment of Copper Ions

A solution containing 300 mg/L of copper sulfate pentahydrate and 600 mg/L of triethylenetetramine was prepared. L of the solution was added with 20 mL of 100 g/L sodium dimethyldithiocarbamate solution and stirred uniformly to obtain a mixed solution. The mixed solution was adjusted to pH of 5 with dilute hydrochloric acid to produce a suspension. After a reaction for 30 min, the suspension was filtered with a quantitative filter paper to obtain a filtrate.

The content of the copper ions was determined using atomic absorption spectrometry and the obtained concentration of copper in the filtrate was 0.11 mg/L. It can be seen that precipitation of copper ions with sodium dimethyldithiocarbamate can effectively remove copper ions in the electroplating wastewater containing aliphatic polyamine complexants.

Experimental Example 5 Treatment of Electroplating Wastewater

Electroplating wastewater was collected from an electroplating sewage treatment plant of an electroplating industrial park, and the electroplating wastewater contained cyanides and complexants such as aliphatic polyamine.

1 L of the electroplating wastewater was adjusted to pH of 11 with lime milk to produce a mixed solution. The mixed solution was added with 15 mL of a sodium hypochlorite solution having an active chlorine concentration of 3% for an oxidation for 180 min. Then the oxidized solution was added with a ferrous chloride solution under stirring to reduce hexavalent chromium, and when a green precipitate of ferrous hydroxide was observed, 3 mL of the ferrous chloride was further added to produce a mixture. After that, the mixture was adjusted again to pH of 11 with lime milk and added with 1 mL of a flocculant for a flocculation for 30 min to produce a suspension. The suspension was subsequently filtered with a quantitative filter paper to obtain a filtrate. The filtrate was adjusted and maintained at pH of 5 with dilute hydrochloric acid and then the adjusted filtrate was added with 2 mL of 100 g/L sodium dimethyldithiocarbamate solution and stirred uniformly to produce a blend. The blend was added with 0.3 g of activated carbon and stirring for 10 min to produce a turbid liquid. The turbid liquid was filtered with a quantitative filter paper to obtain a filtrate.

Total chromium, copper, nickel and zinc were determined using atomic absorption spectrometry, and the cyanide and hexavalent chromium were determined using spectrophotometry. The results of the determination of the filtrate were shown in Table 3. The cyanide, hexavalent chromium, trivalent chromium, copper, nickel, and zinc in the treated wastewater met the requirements in Table 3 of GB 21900-2008.

TABLE 3

Results of treatment for electroplating wastewater

| Items | Results (mg/L) | GB 21900-2008 Standard |
|---|---|---|
| $CN^-$ | 0.13 | up to standard of Table 3 |
| $Cr^{6+}$ | 0.04 | up to standard of Table 3 |
| total Cr | 0.38 | up to standard of Table 3 |
| $Cu^{2+}$ | 0.06 | up to standard of Table 3 |
| $Ni^{2+}$ | 0.08 | up to standard of Table 3 |
| $Zn^{2+}$ | 0.43 | up to standard of Table 3 |

The technical features of the above-described embodiments may be combined in any combination. For a concise description, only a part of the possible combinations of the technical features in the above embodiments are described. However, as long as there is no contradiction between the combinations of these technical features, all combinations should be considered to be within the scope of this description.

The above examples merely describes several embodiments of the present invention, and the specific and detailed description thereof is not intended to limit the scope of the invention. It should be noted that various variations and modifications of the invention made by those skilled in the art without departing from the spirit and scope of the invention should be within the scope of the present invention. Therefore, the scope of the invention is defined by the appended claims.

What is claimed is:

1. A method for treatment of electroplating wastewater without a cyanide and a phosphorus-containing reductant, comprising the following steps:
(a) Adding a ferrous chloride solution into the electroplating wastewater without a cyanide and a phosphorous-containing reductant under mechanical stirring;
(b) Adjusting the electroplating wastewater treated in step (a) with lime milk to pH of 10.5-12; wherein a synergistic effect of ferrous ions and calcium ions enables a complete precipitation of carboxyl-containing organic acid complexants; metal ions releases from complexes react with hydroxyl ions to form hydroxide precipitate; and ferrous ions reduce hexavalent chromium to trivalent chromium to form a chromium hydroxide precipitate;
(c) Flocculating the precipitate in the electroplating wastewater treated in step (b) into particles of large size to settle with a flocculant;
(d) Filtering the electroplating wastewater treated in step (c) to remove the precipitate;
(e) Adjusting and maintaining pH of the electroplating wastewater treated in step (d) at 4.5-5.5 with dilute hydrochloric acid, and introducing a heavy metal capturing agent to precipitate heavy metal ions;
(f) Adding activated carbon to the electroplating wastewater treated in step (e) to absorb the resulting precipitate and the remaining heavy metal capturing agent so as to settle the precipitate;
(g) Filtering the electroplating wastewater treated in step (f) to remove the precipitate; and
(h) Adjusting the electroplating wastewater treated in step (g) to pH of 6-8 with a sodium hydroxide solution, and further processing the resulting electroplating wastewater using a biochemical method.

2. The method of claim 1, wherein the lime milk contains calcium oxide at a concentration of 50-100 g/L.

3. The method of claim 1, wherein the ferrous chloride solution in step (a) contains ferrous chloride tetrahydrate at a concentration of 150-250 g/L; and the ferrous chloride solution is added until a green precipitate of ferrous hydroxide appears, and then the ferrous chloride solution is further added to the electroplating wastewater at a volume ratio of 1-10:1000.

4. The method of claim 1, wherein the heavy metal capturing agent in step (e) is a sodium dimethyldithiocarbamate solution or a sodium diethyldithiocarbamate trihydrate solution at a concentration of 80-120 g/L, and volume ratios of the added sodium dimethyldithiocarbamate solution and sodium diethyldithiocarbamate trihydrate solution to the electroplating wastewater are 0.5-3:1000 and 0.3-5:1000.

5. The method of claim 1, wherein the flocculant in step (c) is a polyacrylamide (PAM) aqueous solution at a concentration of 3-8 g/L;
the dilute hydrochloric acid in step (e) has a concentration of 2%-8% by weight; and the sodium hydroxide solution in step (h) has a concentration of 50-100 g/L.

6. The method of claim 1, wherein the activated carbon in step (f) is a powdered activated carbon for sewage treatment, and the activated carbon is added into the electroplating wastewater at an amount of 50-300 g per ton electroplating wastewater.

7. The method of claim 1, wherein the biochemical method in step (h) employs a microbial degradation technique to perform a reaction in a biochemical reactor for 8-24 hours according to chemical oxygen demand (COD).

* * * * *